June 1, 1926.
J. P. ARNDT
1,586,642
INSULATOR PIN
Filed Dec. 31, 1920
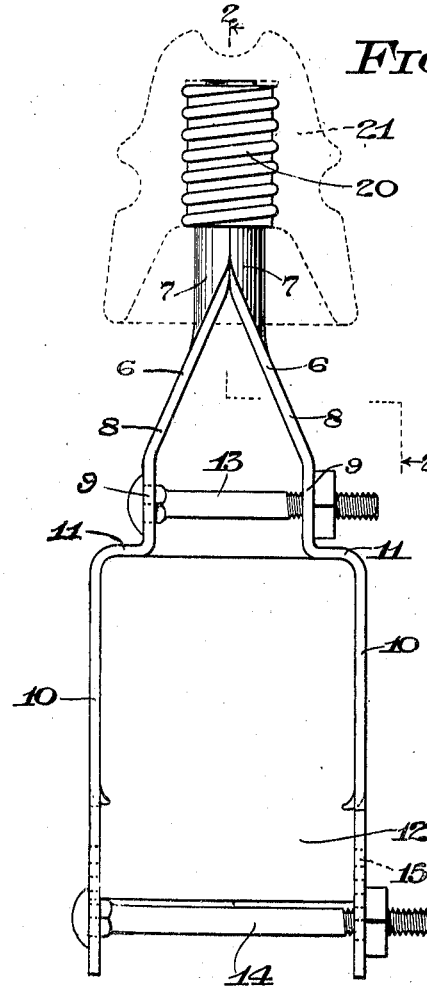
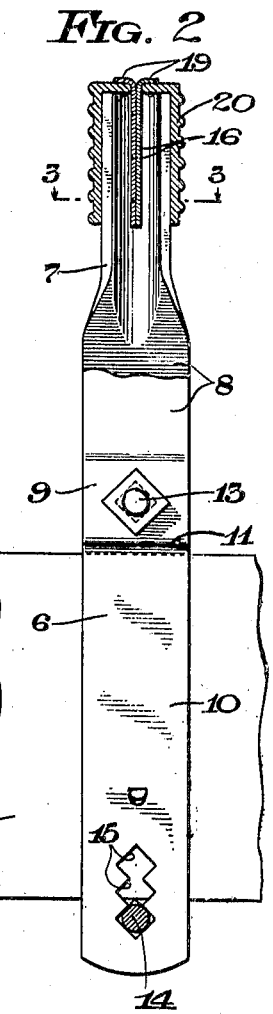
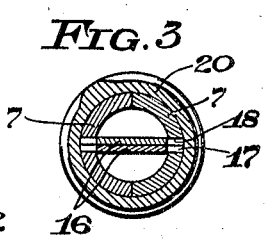
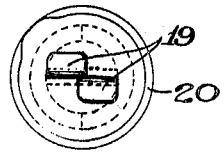
WITNESSES
H. D. Chase
INVENTOR
John P. Arndt
By R. S. Caldwell
ATTORNEY Patented June 1, 1926.

1,586,642

UNITED STATES PATENT OFFICE.

JOHN P. ARNDT, OF SOUTH MILWAUKEE, WISCONSIN, ASSIGNOR TO LINE MATERIAL COMPANY, OF SOUTH MILWAUKEE, WISCONSIN, A CORPORATION OF WISCONSIN.

INSULATOR PIN.

Application filed December 31, 1920. Serial No. 434,309.

The invention relates to insulator pins.

One of the objects of the invention is to provide an insulator pin for attachment to the cross arm of a line conductor pole which may be arranged in different positions on the cross arm and can be used on cross arms of different sizes.

A further object of the invention is to provide an insulator pin made of metal stampings, that is put up in a factory ready for use.

The invention further consists in the several features hereinafter set forth and more particularly defined by claims at the conclusion hereof.

In the drawings: Fig. 1 is an end view of an insulator pin embodying the invention; Fig. 2 is a section taken on the line 2—2 of Fig. 1; Fig. 3 is a section taken on the line 3—3 of Fig. 2; Fig. 4 is a top view of the pin; Fig. 5 is a detail view of one of the parts of the pin.

The insulator pin includes a pair of complementary members 6 formed from flat metal bars by stamping. Each member has a semi-cylindrical head 7, an inclined portion 8, and straight side portions 9 and 10 connected by a laterally extending portion 11. These members 6 are assembled together so that the heads 7 form a cylindrical head, the portions 8 forming diverging arms and the portions 10 and 11 forming clamping members for engaging a cross arm 12. The members 6 are clamped to the cross arm by means of a bolt 13 passing through openings in the portions 9 and by a bolt 14 passing through any one of a set of square holes 15 in the lower ends of side portions 10. The spaced holes 15 permit the pin being used on cross arms of different cross-sectional area, and when the bolts 13 and 14 are tightened up the pin is firmly secured to the cross arm. Furthermore, the adjustable connection above described allows the pin to project from the top, bottom or side of the cross arm.

The members 6 are held in alined position by plates 16 having oppositely disposed projections 17 fitting against relative movement in slots or pockets 18 in the head 7. Each plate 16 is also provided at one end with a bendable tongue 19.

A thimble 20, preferably of soft metal, such as lead, fits over the cylindrical head formed by the head ends 7 of the members 6 and is exteriorly threaded to receive the insulator 21. The thimble is firmly secured to the members 6 by passing the tongues 19 on the plates 16 through a slot in the top of said thimble and bending said tongues over upon the head in opposite directions. The plates 16 thus connect the thimble to the ends of the members 6 and the thimble itself serves to hold the members 6 together.

I desire it to be understood that this invention is not to be limited to any specific form or arrangement of parts except in so far as such limitations are specified in the claims.

What I claim as my invention is:—

1. An insulator pin, comprising a pair of supporting members adapted to be secured to opposite sides of a cross-arm and having semi-cylindrical recessed ends registering together to form a cylindrical head, an exteriorly-threaded tubular insulator-receiving thimble fitting over said registering ends for retaining them together, and means secured within said recessed ends for locking said thimble on said ends against relative movement.

2. An insulator pin, comprising a pair of supporting members adapted to be secured to opposite sides of a cross-arm and having semi-cylindrical ends registering together to form a tubular head, an exteriorly-threaded tubular insulator-receiving thimble fitting over said ends and having inturned parts at its outer end adapted to abut against the end of said tubular head, and means secured within said head for maintaining the registering ends of said members in alignment and passing through the outer inturned parts of said thimble for retaining said thimble on said ends against relative movement.

3. An insulator pin, comprising a pair of supporting members, means clamping said members to opposite sides of a cross arm, said members having registering ends forming a cylindrical head, an exteriorly threaded thimble fitting over said head, a pair of plates having projections disposed in slots in said members and having tongues passing through a slot in the end of the thimble and bent in opposite directions to secure said thimble to said members.

4. An insulator pin, comprising a pair of supporting members, means for securing said members to a cross arm, said members having semi-cylindrical ends registering together to form a tubular head, an exteriorly-threaded insulator-receiving thimble fitting over said head and having an opening in its outer end, and an attaching member secured to said supporting member within the tubular head and extending through the opening in said thimble to engage the outer surfaces of said thimble for retaining it against withdrawal.

In testimony whereof, I affix my signature.

JOHN P. ARNDT.